Patented May 19, 1953

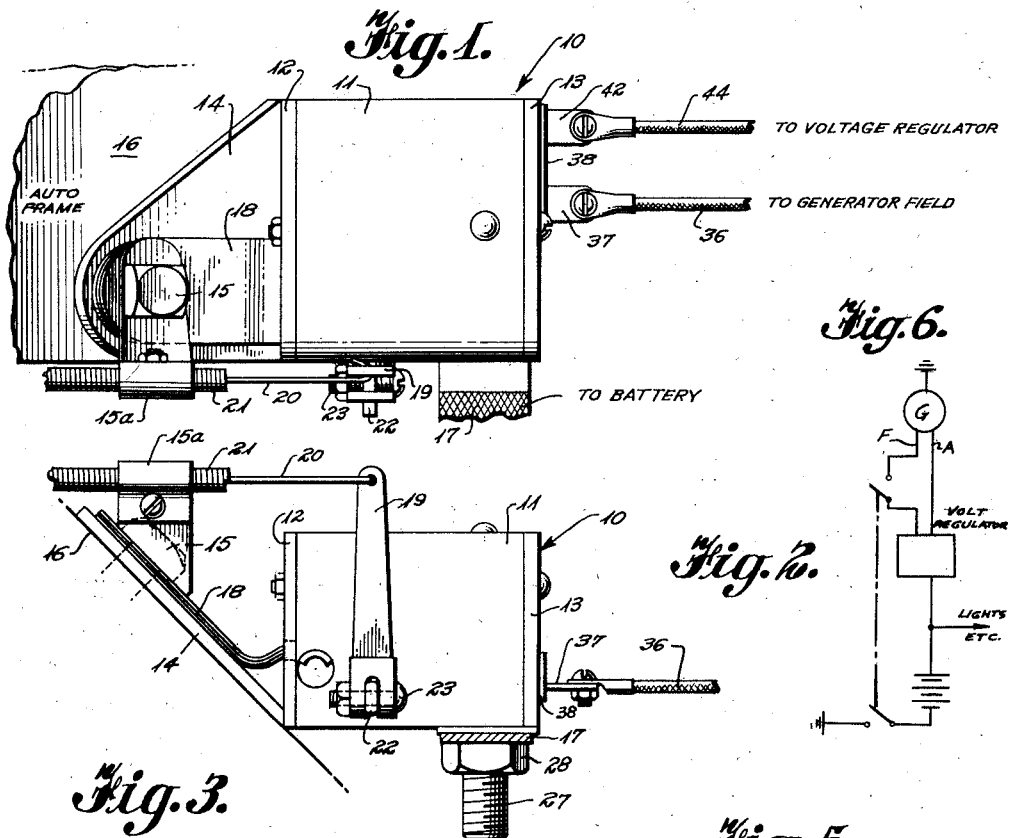

2,639,391

UNITED STATES PATENT OFFICE 2,639,391

CIRCUIT BREAKER

Sink J. Stone, Swannanoa, N. C.

Application February 8, 1950, Serial No. 143,006

8 Claims. (Cl. 307—10)

This invention relates to circuit breakers and more particularly to a manually operated circuit breaker for energizing or de-energizing the electrical circuits of powered vehicles.

While the danger of fires due to short circuits in electrical circuits of automobiles, airplanes and the like, is an ever-present hazard, it is one which attains its greatest proportions as an aftermath of accidents during periods of storage when the condition of the equipment is incident to damage, operator injury or operator absence least likely to be subjected to emergency corrective repair.

The two sources of electrical energy in powered vehicles are the battery and the generator. Accidents causing violent disruptions of the load circuits of these sources frequently cause them to be short-circuited to elements within the vehicle not capable of adequately dissipating the heat energy therefrom, with the result that fires are started. In most cases the natural deterioration of these load elements, particularly during protracted storage, leads to the same result.

In attempts to minimize the fire hazards incident to accidents and protracted storage in vehicles powered by engines employing inflammable fluids, various devices have been developed to disconnect the electrical sources either in response to the shock of a collision or manually when the operator anticipates a collision. These devices have lacked, primarily, the capability of maintaining the safe condition which they establish when they are themselves subjected to accident and have, secondarily, lacked reliability when required to function under emergency conditions after long periods of inactivity. Additionally, those devices which are manually operated are not adapted to de-energize both sources of electrical energy simultaneously, but rather operate to de-energize one source at some time before the other. Then, too, partial operation is entirely possible due to the lack of providing simultaneous operation and positive retention of the device in the de-energizing position. In such cases the device, when actuated by the operator, may de-energize one source and not the other, or may, for a time, de-energize both but gradually restore itself into the energizing position.

Furthermore, the prior art safety devices of the circuit breaking type have been rather overspecialized with respect to adaptability either to accident operation or operation under conditions of storage.

The prior art devices have been designed to de-energize the battery by disrupting its ground circuit and to de-energize the generator by short-circuiting it to ground. In such cases, the generator having practically zero load, the load will demand practically all, if not all, of the generator output. This, of course, "starves" the generator field and the generator ceases to function. It is quite apparent that in such systems the short-circuiting switch must be capable of handling and dissipating large amounts of current. Such systems are not desirable in most instances because they subject the generator to unnecessary strains, both electrical and mechanical.

It is therefore an object of this invention to overcome the foregoing deficiencies of the prior art and to provide a vehicle circuit breaker which will maintain a safe or open circuit position when subjected to severe shock and damage, and which is equally reliable for accident fire protection or storage fire protection, regardless of how long it may have been inactive before being placed in protective or operating position.

It is likewise an object of this invention to provide a manually operated powered vehicle safety circuit breaker easily accessible to the operator of the vehicle which will de-energize the battery and the generator simultaneously.

It is another object of this invention to incorporate into the circuit breaker a means of actuation which is easily operated and can be placed in position either to energize or de-energize the electrical circuit and to afford means of maintaining the circuit breaker in either of these desired positions.

It is another object of this invention to incorporate the circuit breaker into the battery-generator circuit in a manner as to greatly reduce the strain on the circuit when the breaker suddenly de-energizes the electrical system.

It is another object of this invention to provide a circuit breaker which when placed in the circuit opening position de-energizes all power supplies and consequently makes it increasingly difficult for one not aware of this breaker to steal the automobile.

Broadly, this invention relates to a manually operated circuit breaker for de-energizing or energizing electrical circuits of powered vehicles which is actuated at a point distant from the points in an electrical circuit which are to be broken and which can be rigidly held in a position of make or break as may be desired.

Other and further objects of this invention will be apparent upon consideration of the following description of a preferred embodiment thereof in conjunction with the annexed drawings wherein:

Figure 1 is a top view of the circuit-breaker housing assembly shown mounted to the auto frame;

Figure 2 is a view in side elevation of the circuit-breaker housing assembly constructed in accordance with the teachings of this invention;

Figure 3 is a fragmentary side view partially cut away, of the circuit breaker shown in open-circuit position by the solid lines and in closed-circuit position by the dotted lines;

Figure 4 is a view of Figure 3 along the line 4—4 of Figure 3;

Figure 5 is a view of Figure 3 along the line 5—5 of Figure 3.

Figure 6 is a diagrammatic representation of the electrical circuit involved in this invention.

Referring now to Figure 1, the circuit breaker is enclosed in a suitable housing 10. The housing as shown in this figure and in subsequent figures includes a main case 11 which is a formed metal part and end covers 12 and 13, the entire housing being, in turn, welded or riveted to a metal frame 14. The metal frame 14 is, in turn, mounted by any suitable means such as bolt 15 to the auto frame 16.

The circuit breaker which is housed within the housing 10 is constructed so as to connect or disconnect simultaneously the battery from ground and to connect or disconnect simultaneously the electrical circuit running from the generator field windings to the voltage regulator. This latter provision is for the purpose of disrupting the field current supply.

The generator which is in most cases shunt wound has in its field winding circuit, the circuit breaker and a voltage regulator, both connected in series. When this circuit is broken, the field windings are de-energized and the generator ceases to function.

In Figure 1 is shown the lead from the battery which is usually a flexible, laminated conductor indicated here by numeral 17. The ground circuit to the battery is completed through the circuit breaker within the housing 10 to the flexible, laminated conductor 18 held in place against the metal frame 14 which is grounded to the auto frame by the bolt 15.

As shown in Figure 2, the circuit breaker within the housing 10 is actuated by a lever arm 19 which is pivoted at the lower end of the housing 10. To the top of the lever arm 19 is mounted, by any suitable means, a flexible wire 20 which extends through a flexible conduit 21 to the circuit breaker operating sub-assembly, not shown, which is mounted in the operator's compartment of the car, usually located on the dashboard for easy access by the operator. The flexible conduit supporting the flexible conductor is mounted to the metal frame 14 by any suitable means such as the supporting member 15a and the bolt 15. The operating sub-assembly is not per se a part of this invention. It has been completely described by this inventor in his copending application, Serial No. 97,475, filed June 6, 1949, now Patent No. 2,529,195.

In Figure 2 the lever arm 19 is in a vertical position and the circuit breaker is in circuit-open position. The lever arm is pivoted at the lower end of the housing to an operating cam 22 and bolted thereto by the bolt and nut arrangement 23. The action of the lever arm and the cam to operate the circuit breaker is shown in Figure 3.

As shown in Figure 3 by solid lines, when the circuit breaker is in circuit-open position with the lever in vertical position as shown in Figure 2, the operating cam 22, which extends through the housing 10 and has a smaller portion on one end adapted to extend through the opening 24 in the housing 10, acts against the spring 25 mounted between the housing main frame 11 and the said switch by any suitable means, to open the battery ground circuit.

The ground circuit to the battery is made through the flexible laminated conductor 17, the bolt 27 which in conjunction with the nut 28 secures the conductor 17 to the main case 11, the switch point 30 of the switch arm 31, the flexible, laminated conductor 18 mounted to the arm 31 by screw member 32, the metal frame 14 and auto frame 16. The bolt 27 is insulated from the housing by strips of insulating material 26 and 29.

As has been mentioned previously, in Figure 3 the solid line position of the circuit breaker is representative of the breaker in circuit-open position. The cam 22 is in a vertical position by virtue of the attitude of the lever arm 19 attached thereto, and the switch arm 31 is thereby forced against the spring 25 to remove the contact point 30 from engagement with the bolt 27. The switch arm 31 is pivotally mounted to the housing by any suitable means such as the arcuate pivot member 34 mounted for peripheral movement within the opening 35 in the housing main case 11.

The open-circuit position of the circuit breaker is rigidly maintained by the action of the operating sub-assembly located in the operating compartment. When the operating sub-assembly is released, the flexible conductor 20 releases the tension on the lever 19 and forces the cam 22 into the dotted line position as shown in Figure 3. This allows the spring 25 to force the switch arm 31 to a position shown in dotted lines in this figure where the switch point 30 contacts the bolt 27 thus grounding the battery.

As shown in Figure 4, the operation of the flexible conductor 20 in cooperation with the operating sub-assembly and the lever arm 19 also holds in circuit-open position the circuit between the generator field and the voltage regulator. As was shown in Figure 1 the generator field is connected to the circuit breaker through the conductor 36 and mounted to the metal contact piece 37 extending out of the housing 10 and insulated therefrom by insulating material 38. The circuit from this metal strip 37 to the voltage regulator is made through the circuit breaker.

Referring again to Figure 4, the metal contact piece 37 which is insulated from the housing by the insulating strips 29 and 38 has a contact point 39 which through the spring bias contact point 40 mounted to but insulated from switch arm 31a, the L-shaped arm 41 connected thereto, makes contact with the metal strip body 42 which is, exterior to the housing, connected to the conductor 44 leading to the voltage regulator as shown in Figure 1. As shown in Figure 4, the circuit breaker has opened the circuit between the generator field and the voltage regulator by virtue of the positioning of the lever arm 19 to hold the cam 22 in vertical position and to force the contact arm 31a against the action of the spring 43.

When the switch is in the circuit-closed position, the cam 22 is forced into a position offset from the vertical as shown in the dotted lines in Figure 3 by the action of the flexible conductor 20 on the lever arm 19. The contact point 39 is forced into contact with the contact point 40 by the action of the spring 43 mounted to but insulated from the housing 10 by any convenient means and the L-shaped contact arm 41 contacts the metal strip 42. The circuit between the generator field and the voltage regulator is then closed.

As shown in Figure 5, which is a view taken along the line 5—5 of Figure 3, the switch arm 31 for the battery circuit and the switch arm 31a for the generator field and voltage regulator circuit are both mounted to the arcuate pivot member 34 and are spaced from one another. The laminated flexible conductor 16 which is mounted to the switch arm 31 is held in place by the screw 32, which also holds the spring 25 in frictional engagement with this switch arm assembly. The spring 43 is mounted to the switch arm 31a by any suitable means such as screw 45.

To summarize the operation of the circuit breaker, the circuit breaker is normally held by the action of the springs 25 and 43 in circuit-closed position, as shown in Figure 3 by dotted lines. In this position the ground circuit of the battery is made through the laminated flexible conductor 17 through the bolt 27, the contact point 30, the laminated flexible conductor 18, the metal frame 14 and the auto frame 16. The closed circuit between the generator field and the voltage regulator in this position is made through the metal strip 37, the contact point 39, the contact point 40 mounted on the switch arm 31a, the L-shaped metal bar 41 and the metal strip 42. In this position the lever arm 19 is released by the operating sub-assembly into a position reclined from the vertical, and the cam 22 is therefore also in a position reclined from the vertical.

When the operator wishes to open the battery circuit and the circuit between the generator field and the voltage regulator, the operating sub-assembly in the operator compartment is actuated to force the lever arm 19 to a vertical position as shown in Figure 2 in solid lines and the cam 22 forces the switch arms 31 and 31a to open both circuits, pivoting both of these switch arms on the arcuate pivot member 34 to which they are mounted. The switch point 30 is then out of contact with the bolt 27. The switch point 39 is out of contact with the switch point 40. The battery circuit to ground is open and the circuit between the generator field and the voltage regulator is open. The circuit breaker is held in this position by the operating sub-assembly.

What has been described is a specific embodiment of this invention but also within its spirit are all those embodiments obvious to one skilled in the art.

The switch as heretofore described operates with an operating assembly of the type disclosed in this inventor's copending application Serial No. 97,475, filed June 6, 1949. However, it should be noted that due to the peculiar details of the operating cam 22, no particular locking means is required in the said operating assembly. The cam 22 is, as shown in Figure 3, knife-edged. The flat portion or base when resting totally on the bottom of the housing, and in this attitude receiving the inclined switch arm 31 on the knife-edge side, is locked thereby in position. When the cam is pivoted from this position as shown in dotted lines in Figure 3, the springs 25 and 43 hold the arm 31 in this position. It is evident, therefore, that the switch assembly may operate without locking means provided in the operating sub-assembly for insuring positive retention of the switch in open or closed position.

What is claimed is:

1. Apparatus for controlling an automotive electrical circuit including a battery and a generator having field windings therefor comprising a single-throw double pole switch, a ground line from said battery passing through one of the poles of said switch, the field windings of said generator connecting through the other pole of said switch, means to normally bias both poles of said switch in circuit-closing position, means to overcome said bias to simultaneously place both poles of said switch in circuit-opening position.

2. Apparatus for controlling an automotive electrical circuit including a battery and a generator having field windings therefor comprising a single-throw double pole switch, a ground line from said battery passing through one of the poles of said switch, the field windings of said generator connecting through the other pole of said switch, means to normally bias both poles of said switch in circuit-closing position, means to overcome said bias to simultaneously place both poles of said switch in circuit-opening position, operating means to rigidly hold the poles of said switch in circuit-opening position.

3. Apparatus for controlling an automotive circuit including a battery and a generator having field windings therefor comprising a ground line from said battery passing through one of the poles of said switch, the field windings of the generator connecting through the other pole of said switch, a spring mounted to each of the poles of said switch to normally bias said switch in circuit-closing position, means to overcome said bias to simultaneously place both poles of said switch in circuit-closing position.

4. Apparatus for controlling an automotive circuit including a battery and a generator having field windings therefor comprising a single-throw double pole switch, a ground line from said battery passing through one of the poles of said switch, the field windings for the generator connecting through the other pole of said switch, means to normally bias both poles of said switch in circuit-closing position, a cam mounted to cause the poles of said switch to overcome said bias and simultaneously to place the poles of said switch in circuit-opening position, a lever arm connected to said cam and means to operate said lever arm.

5. Apparatus for controlling an automotive circuit including a battery and a generator having field windings therefor comprising a single-throw double pole switch, a ground line from said battery passing through one of the poles of said switch, the field windings for the generator connecting through the other pole of said switch, means to normally bias both poles of said switch in circuit-closing position, a cam mounted to cause the poles of said switch to overcome said bias and simultaneously to place the poles of said switch in circuit-opening position, a lever arm connected to said cam, means to operate said lever arm, and operating means to rigidly hold said switch in circuit-opening position.

6. Apparatus for controlling an automotive circuit including a battery and a generator having field windings therefor comprising a single-throw double pole switch, said poles being mounted in spaced relation at their ends to an arcuate pivot member, a ground line from said battery passing through one of the poles of said switch, the field windings of the generator connecting through the other pole of said switch, means to normally bias both poles of said switch in circuit-closing position, means to pivot said poles about said arcuate pivot member to overcome the said bias and to simultaneously place both poles of said switch in circuit-opening poistion.

7. Apparatus for controlling an automotive circuit including a battery and a generator having field windings therefor comprising a single-throw double pole switch, said poles being mounted in spaced relation at their ends to an arcuate pivot member, a ground line from said battery passing through one of the poles of said switch, the field windings of the generator connecting through the other pole of said switch, means to normally bias both poles of said switch in circuit-closing position, a cam mounted to cause the poles of said switch to pivot about the said arcuate pivot member to overcome said bias and to simultaneously place the poles of said switch in circuit-opening position, a lever arm connected to said cam, and means to operate said lever arm.

8. Apparatus for controlling an automotive circuit including a battery and a generator having field windings therefor comprising a single-throw double pole switch, said poles being mounted in spaced relation at their ends to an arcuate pivot member, a ground line from said battery passing through one of the poles of said switch, the field windings of the generator connecting thorugh the other pole of said switch, means to normally bias both poles of said switch in circuit-closing position, a cam mounted to cause the poles of said switch to pivot about the said arcuate pivot member to overcome said bias and to simultaneously place the poles of said switch in circuit-opening position, a lever arm connected to said cam, means to operate said lever arm and operating means to rigidly hold said switch in circuit-opening position.

SINK J. STONE.

References Cited in the file of this patent

UNITED STATES PATENTS

| Number | Name | Date |
| --- | --- | --- |
| 1,270,994 | Walkup | July 2, 1918 |
| 1,473,586 | Patterson | Nov. 6, 1923 |
| 1,512,105 | Knapp | Oct. 21, 1924 |
| 1,512,244 | Simmons et al. | Oct. 21, 1924 |
| 1,819,831 | Whalen | Aug. 18, 1931 |
| 1,966,077 | Nyman | July 10, 1934 |
| 2,096,291 | Tanner | Oct. 19, 1937 |
| 2,277,671 | Williams et al. | Mar. 31, 1942 |
| 2,439,634 | Robey | Apr. 13, 1948 |
| 2,503,862 | Allgeyer | Apr. 11, 1950 |

FOREIGN PATENTS

| Number | Country | Date |
| --- | --- | --- |
| 573,402 | France | Mar. 10, 1924 |
| 526,752 | Great Britain | Sept. 25, 1940 |